(12) United States Patent
Wagner et al.

(10) Patent No.: US 12,474,394 B2
(45) Date of Patent: Nov. 18, 2025

(54) AUTOMATED TEST EQUIPMENT FOR TESTING SEMICONDUCTOR DEVICES

(71) Applicant: Cohu GmbH, Kolbermoor (DE)

(72) Inventors: Markus Wagner, Kolbermoor (DE); Johann Pötzinger, Fischbachau (DE); Alan Whyte, Karlsfeld (DE); Kevin Ludwig, San Diego, CA (US); Justin Felten, Saint Paul, MN (US)

(73) Assignee: Cohu GmbH, Kolbermoor (DE)

( * ) Notice: Subject to any disclaimer, the term of this patent is extended or adjusted under 35 U.S.C. 154(b) by 318 days.

(21) Appl. No.: 17/799,210

(22) PCT Filed: Feb. 5, 2021

(86) PCT No.: PCT/EP2021/052862
§ 371 (c)(1),
(2) Date: Aug. 11, 2022

(87) PCT Pub. No.: WO2021/160537
PCT Pub. Date: Aug. 19, 2021

(65) Prior Publication Data
US 2023/0073230 A1    Mar. 9, 2023

(51) Int. Cl.
*G01R 31/28* (2006.01)
*G01R 1/02* (2006.01)
(Continued)

(52) U.S. Cl.
CPC ....... *G01R 31/2834* (2013.01); *G01R 1/0433* (2013.01)

(58) Field of Classification Search
CPC . G01R 1/02; G01R 1/04; G01R 1/067; G01R 1/073; G01R 1/0433; G01R 31/02;
(Continued)

(56) References Cited

U.S. PATENT DOCUMENTS 6,066,822 A * 5/2000 Nemoto ........... G01R 31/31912
209/552
6,078,188 A * 6/2000 Bannai ............... G01R 31/2851
700/214
(Continued)

FOREIGN PATENT DOCUMENTS

WO   WO-2012/118880         9/2012
WO   WO-2012/159003 A1    11/2012
(Continued)

OTHER PUBLICATIONS

International Search Report and Written Opinion for PCT Application No. PCT/EP2021/052862 dated Apr. 21, 2021 (15 pages).

*Primary Examiner* — Neel D Shah
(74) *Attorney, Agent, or Firm* — Knobbe, Martens, Olson & Bear, LLP

(57) ABSTRACT

An automated test equipment (ATE) for testing semiconductor devices, the test equipment comprises a test handler, a spare part, or a contactor socket, and a semiconductor devices tester, The spare part comprises an electronic component for storing and/or processing data regarding the spare part or a portion thereof, The test equipment comprises an operator terminal comprising a display or GUI and a data exchange interface which is connected or connectable to the electronic component within the spare part, for at least displaying data stored therein. The ATE further comprises a data buffer unit for buffering the data, a maintenance planning and control unit for planning and controlling maintenance actions of the test equipment, and a dedicated database residing in a control computer.

20 Claims, 7 Drawing Sheets

(51) Int. Cl.
    *G01R 1/04*          (2006.01)
    *G01R 1/067*        (2006.01)
    *G01R 1/073*        (2006.01)
    *G01R 31/26*        (2020.01)

(58) Field of Classification Search
    CPC .... G01R 31/26; G01R 31/2601; G01R 31/28;
                               G01R 31/2834; G01R 31/2893
    See application file for complete search history.

(56) References Cited

U.S. PATENT DOCUMENTS

| | | |
|---|---|---|
| 7,474,089 B2 | 1/2009 | Gibbs et al. |
| 2004/0066207 A1 | 4/2004 | Bottoms et al. |
| 2008/0126863 A1* | 5/2008 | Co .......................... G11C 29/56 |
| | | 714/E11.169 |

FOREIGN PATENT DOCUMENTS

| | | |
|---|---|---|
| WO | WO-2013/155348 A1 | 10/2013 |
| WO | WO-2015/081081 A1 | 4/2015 |
| WO | WO-2021/160537 A1 | 8/2021 |

* cited by examiner

AUTOMATED TEST EQUIPMENT FOR TESTING SEMICONDUCTOR DEVICES

This application is a national phase of international Patent Application PCT/EP2021/052862 and claims the benefit of the filing date of European patent application EP 20157204.7 filed Feb. 13, 2020, the disclosure of which is hereby incorporated herein by reference."

DESCRIPTION

Field of the Invention

The invention is related to an automated test equipment for testing semiconductor devices, the test equipment comprising a test handler, a spare part, in particular a contactor socket, and a semiconductor devices tester, wherein the spare part comprises an electronic component for storing and/or processing data regarding the spare part or a portion thereof.

Technological Background

As background prior art, reference is made to WO2012159003A1, US2004066207A1, U.S. Pat. No. 7,474,089B2, WO2013155348A1, WO2015081081A1.

SUMMARY OF THE INVENTION

There may be a need to provide an improved automated test equipment (ATE) which in particular provides more options for appropriately and flexibly handling parameters which are measured within a spare part (contactor socket) and which can be used in planning and controlling test procedures and in maintaining the test equipment.

Whereas the appending claims are apparatus claims, the invention can also be carried out as a process of operating and automated test equipment, with process steps which correspond to the apparatus features in the appending claims.

According to an exemplary embodiment of the invention an automated test equipment for testing semiconductor devices comprises a test handler, a spare part, in particular a contact socket, and a semiconductor devices tester, wherein the spare part comprises an electronic component for storing and/or processing data regarding the spare part or a portion thereof, and wherein the test equipment comprises an operator terminal comprising a display or GUI and a data exchange interface which is connected or connectable to the electronic component within the spare part, for at least displaying data stored therein.

The expression "automated test equipment (ATE)" may denote a system typically including a handler, and a tester for testing semiconductor devises (DUTs). The expression "operator terminal" may denote a portable device, comprising a data exchange interface for receiving data, and a screen for displaying information, in particular the received data. Further, the operator terminal may comprise an independent, also portable power supply. The expression "spare part" may refer to a part of the handler, or a part inside the handler, which wears down upon typical use of the ATE. A spare part may be a contact socket, a lead backer, a contact unit holder, a PCB, a handler part for generating stimuli used in MEMS testing, a plunger, and the like. In addition to its specific purpose and design, the spare part may further comprise a memory, a sensor, and a spare part interface. The spare part interface may exchange data with the data exchange interface of the operator terminal.

According to an exemplary gist of the invention an automated test equipment (ATE), including a handler, and a tester, comprises: a separable (display) terminal, and a spare part comprising an electronic component for storing. Data stored in the electronic component of the spare part, may be submitted to the operator terminal, and data may be submitted from the operator terminal to the spare part, for being stored in the electronic component of the spare part. The operator terminal may comprise a data exchange interface for connecting to the electronic component of the spare part, so that the electronic component of the spare part, and the operator terminal may exchange data. The exchanged data may include data about a previous use of the spare part, and/or instructions for a future use of the spare part. The terminal, or operator terminal may be small enough so that an operator working on a test floor may easily be able to carry the (operator) terminal to a working place where it is needed. The operator may see at the screen, or display of the operator terminal, whether some tasks should be done. The operator terminal may comprise a data exchange interface to connect to various other devices within the devices of the ATE, such as to the tester, the handler, the electronic component of the spare part, and/or a manual maintenance basis.

The spare part may comprise one or more sensors by which a use of the spare part may be captured and the sensor data may include performance data which may be stored in the electronic component to be later submitted towards the operator terminal. The combination of the spare part storing data of its own use and the portable operator terminal, may allow for analysing the use of the spare part for purposes of monitoring and maintenance "on the fly".

The operator terminal having a display may allow for quickly gather information about, e.g. touchdown numbers, and/or maintenance instructions. In particular, displayed information may comprise a sentinel bit, a value for the latest service tag, a slave address. The operator terminal may have a GUI being displayed so that the content on the handheld may be selectable, and/or customizable. An ID tag may be unique for every spare part.

According to an embodiment of the invention an automated test equipment for testing semiconductor devices comprises a test handler, a spare part, in particular a contactor socket, and a semiconductor devices tester, wherein the spare part comprises an electronic component for storing and/or processing data regarding the space part or a portion thereof, wherein the test equipment comprises a data buffer unit comprising a data exchange interface which is connected or connectable to the electronic component within the spare part, for buffering data stored therein.

The expression "data buffering unit" may refer to a storage device, in particular, a storage device comprising one or more data exchange interfaces, for storing processing data generating of the ATE. The data buffering unit may be positioned in a moderate temperature area of the ATE system, so that the ID tag, and sensing data generated by the sensing device and exchanged between the data exchange interface (of the data buffer unit) and the data exchange interface of the spare part can be stored in the data buffer unit independently of the operating temperature of the ATE system. The electronic component of the spare part may comprise a microcontroller for processing data from its sensors so that the data buffering unit may store extracted data coming from the spare part. The data buffering unit may use the same memory (e.g. EEPROM), or same type of memory for every connected spare part and may be adapted to address multiple spare parts. Further, the data buffering unit may comprise a micro controller dedicated to one or more spare parts, so that the micro controller of the data buffering unit may address multiple spare parts (e.g. 8 spare parts). E.g. the data buffering unit may store the number and/or the time of the last insertion. The data buffering unit may calculate a (simplified) insertion prediction. The data buffering unit may be adapted to report a setup conclusion and/or may provide a checksum test. Each of the spare parts may comprise a unique service tag number. The spare parts may comprise a temperature stable memory for storing data up to 175° C. In particular, the temperature stable memory may be writable up to a temperature of 150° C. The spare part may be a contact socket. Depending on considerations about temperature capabilities of the data buffering unit and/or the memory of the electronic component (of the spare part) time and data may vary depending on the temperature of the spare part and/or the temperature of the data buffer unit. The data may be exchanged by the data buffering unit by wire and/or wireless.

The data buffering unit may be located on a board, and or an interface board, when connecting to the plurality of spare parts (sockets). The interface board may comprise sensors as a basis for controlling the data exchange from and the with the spare part. The data buffering unit may connect to the interface board with an adaptor so that the adaptor may remain while the data buffering unit and/or the spare part may be exchangeable. Further, the data buffering unit may be adapted to identify contact sockets and contact sites. The data buffering unit, the spare part, or the socket or the batch of sockets may have a common power supply. As an alternative, the spare part and the data buffering unit may have a different power supply, e.g. an external power supply, be self-powered, a power supply from the tester to the test board, and a power supply from the handler to the data exchanged interface. The data buffering unit may be adapted to do a contact site assignment.

The data buffering unit may be connected to the socket, or sockets by one or more interfaces being located in between the socket(s) and data buffering unit. The connection between the data buffering unit and the spare parts (contact sockets) may comprise: PCB-flex line, and/or wireless (gigabyte) connection. The data buffering unit may connect, (or code) to a number of up to 4 contact sites, including 8 contact sockets. The connection between the data buffering unit and the spare part(s) (or contact socket(s)) may be combined with an air supply, which also is called manifold. The connection between the data buffering unit and the spare part (contact socket) may be in combination with a mechanical fixture, and or the test board. The interface connecting to the contact socket may comprise and realize mechanical, and/or sensor, and/or electrical features. The data buffering unit may be upgradable by using the operator terminal.

According to an exemplary embodiment of the automated test equipment, is the electronic component located in a temperature chamber, and the data buffering unit is located outside of the temperature chamber, wherein the data buffering unit comprises a data exchange interface to connect to the operator terminal for at least displaying buffer data stored in the buffer unit.

According to an embodiment of the invention an automated test equipment for testing semiconductor devices comprises a test handler, a spare part, in particular a contactor socket, and a semiconductor devices tester, wherein the spare part comprises an electronic component for storing and/or processing data regarding the space part or a portion thereof, wherein the test equipment comprises a maintenance planning and control unit comprising a processing unit and a data exchange interface which is connected or connectable to the electronic component within the spare part, for planning and controlling maintenance actions of the test equipment. Originating from the electronic component, and/or via the data exchange interface, the planning and control unit may receive the data originating from the sensor(s), wherein the data include the ID tag from the specific spare part of the specific sensor(s). The planning and control unit may derive maintenance instructions based on the received data from the sensing device and may send these maintenance instructions to the data buffer unit and/or to the socket(s) being specified by the respective ID tag. The type of sensor(s) may include at least one of the group of a touch down counter, a temperature sensor, a pressure sensor, an acceleration sensor, and an ESD sensor. The planning and control unit may be located in the handler, and/or in the device tester.

The maintenance instructions may be based upon a feedback of the sockets, and or based on a database of an external network, including a data analysis, and may in particular be based upon sensing data from the sensor(s) of the spare part(s), or sockets(s). The database of the external network may comprise data of the equipment health statistics.

The maintenance instructions may comprise periodical monitoring advice, a forecast based on network knowledge, wherein the forecast may include a forecast on equipment availability. The maintenance instructions may inform about a predictive maintenance, including cleaning and replacement recommendation. Further, the maintenance instructions may include recognizing an emergency and generating an emergency stop (e.g. upon temperature discrepancies). The maintenance instructions include data combination and consolidation. The maintenance instructions may preferably result in an improved performance yield, may consider a KPI (key performance indicator), and may include self-learning and/or failure pattern recognition. According to an embodiment of the invention an automated test equipment for testing semiconductor devices comprises a test handler, a spare part, in particular a contactor socket, and a semiconductor devices tester, wherein the spare part comprises an electronic component for storing and/or processing data regarding the spare part or a portion thereof, wherein the test equipment comprises a dedicated database residing in a control computer, and a data exchange interface which is connected or connectable to the electronic component within the spare part, for storing data regarding a working setup for the spare part in the database for use by the test handler.

The dedicated database residing in the control computer may comprise setup instructions based on the ID tag being submitted via the data exchange interface to the control computer. That is, for a given ID tag there may be an entrance in the dedicated database about the working setup, which in turn may be shown and/or requested via a GUI of the operator terminal and/or via a GUI of the handler. The spare part may comprise an optical alarm device (lamp), if there is an issue or an inappropriate setup detected. In this situation the control computer may trigger an alarm message, in particular, the optical alarm from the spare part. The inappropriate setup may be based on an appropriate assignment and/or a position of the spare part and/or matching equipment regarding the ID tag. The working setup may comprise an application dependent recipe in order to include a time reduction for the setup and/or the maintenance. The dedicated database may comprise or generate information about a failsafe setup.

The dedicated database may comprise information specific to the specifications of the handler/tester system (including the spare parts), the test floor and/or the site fleet performance. The dedicated database may additionally consider data from the sensor(s), operations data, and a power monitoring for a specific type of test and/or historic data. The database may comprise customer specific requirements. In particular, a calibration of the equipment may be based on sensor results (or data) of the spare part. The spare part may trigger an optical alarm if the control computer sends the alarm message to the spare part.

The control computer may provide controls for a self-calibration. The data for the self-calibration may consider information about at least one of the group of MEMS specific applications, HF applications, and/or temperature requirements. The data for the self-calibration may be loadable and may undergo an update.

The control computer may comprise information about a correct, and/or required yield.

In addition, the control computer may control automated cleaning, and may control actuators regarding the spare part. The control computer may compare current data with historical data, and may consider a comparison of similar applications, and/or real data. The instructions from the control computer may lead to a better yield.

The result(s) and/or instructions of the control computer may include strategic recommendations for automated and/or manual adjustments, and may lead to an amendment of equipment utilization and efficiency. The control computer is adapted to detect or derive sensor deviations, and may make check sum tests. The socket ID and self-checking equipment may avoid a mismatch for the setup.

Aspects of the invention are as follows:

According to an exemplary embodiment of the automated test equipment, the spare part may comprise a temperature sensor and/or a pressure sensor and/or an acceleration sensor and/or an ESD sensor and/or a touchdown counter, each internally connected to the electronic component.

According to an exemplary embodiment of the automated test equipment, the electronic component may comprise a programmable microcontroller and/or a memory, in particular an EEPROM, which in particular is temperature-stable up to 175° C.

According to an exemplary embodiment of the automated test equipment, the spare part may comprise a unique ID tag and the data exchange interface, is adapted to transmit the ID tag to outside the spare part.

According to an exemplary embodiment of the automated test equipment, the spare part may comprise a spare part interface adapted to be connected to the data exchange interface.

According to an exemplary embodiment of the automated test equipment, the data exchange interface, is, at least in part, common for the operator terminal and the data buffer unit and/or the maintenance planning and control unit and/or the dedicated database.

According to an exemplary embodiment of the automated test equipment, the operator terminal may comprise a handheld computer which comprises means for processing data obtained from the electronic component within the spare part and/or for sending data and/or instructions to the electronic component. The handheld computer may comprise a central processing unit, and a data storage unit, a data exchange interface, according to the spare part, an internet interface, including a wireless, and/or wired internet interface, a power supply interface, and one or more interfaces having a high bandwidth for exchanging data with the data buffer unit. In addition, the handheld may comprise an ADC, an alarm LED, and/or an EPROM.

The handheld computer may be adapted to check a sentinel bit, to determine the slave address, may allow for DDD (double device detection), may allow for check of number of insertions, and may comprise an increment counter. The microcontroller on the spare part may be programmable by the handheld computer.

According to an exemplary embodiment of the automated test equipment the handheld computer may comprise an internet interface for at least temporarily connecting it to the internet, in particular for upgrading the handheld computer and/or for receiving maintenance instructions and/or firmware updates regarding the test equipment through the internet.

The handheld computer (operator terminal) may be upgradable over the internet. Via the internet, the handheld computer may receive a feedback (changed maintenance instructions) via the internet, or may receive data on firmware updates and/or maintenance updates.

According to an exemplary embodiment of the automated test equipment, the data buffering unit may be adapted to address multiple spare parts, and in particular comprises a microcontroller which is adapted to process data from multiple spare parts, and/or to derive data and/or instructions for multiple spare parts.

According to an exemplary embodiment of the automated test equipment, the data buffering unit may be located on a board which is connected or connectable to multiple spare parts, or is located on an interchangeable interface board.

According to an exemplary embodiment of the automated test equipment, the maintenance planning and control unit may be adapted to derive maintenance instructions based on data regarding and obtained from the spare part and in particular includes a data statistics unit and/or a predictive maintenance triggering unit and/or a failure pattern recognition unit and/or an emergency stop triggering unit.

According to an exemplary embodiment of the automated test equipment, the dedicated database may comprise information regarding a test floor and/or a site fleet performance and/or sensor data and/or operations data and/or power monitoring data regarding specific tests.

Further embodiments of the invention are disclosed in the appending figures.

DETAILED DESCRIPTION OF EXEMPLARY EMBODIMENTS

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

Figure 7:
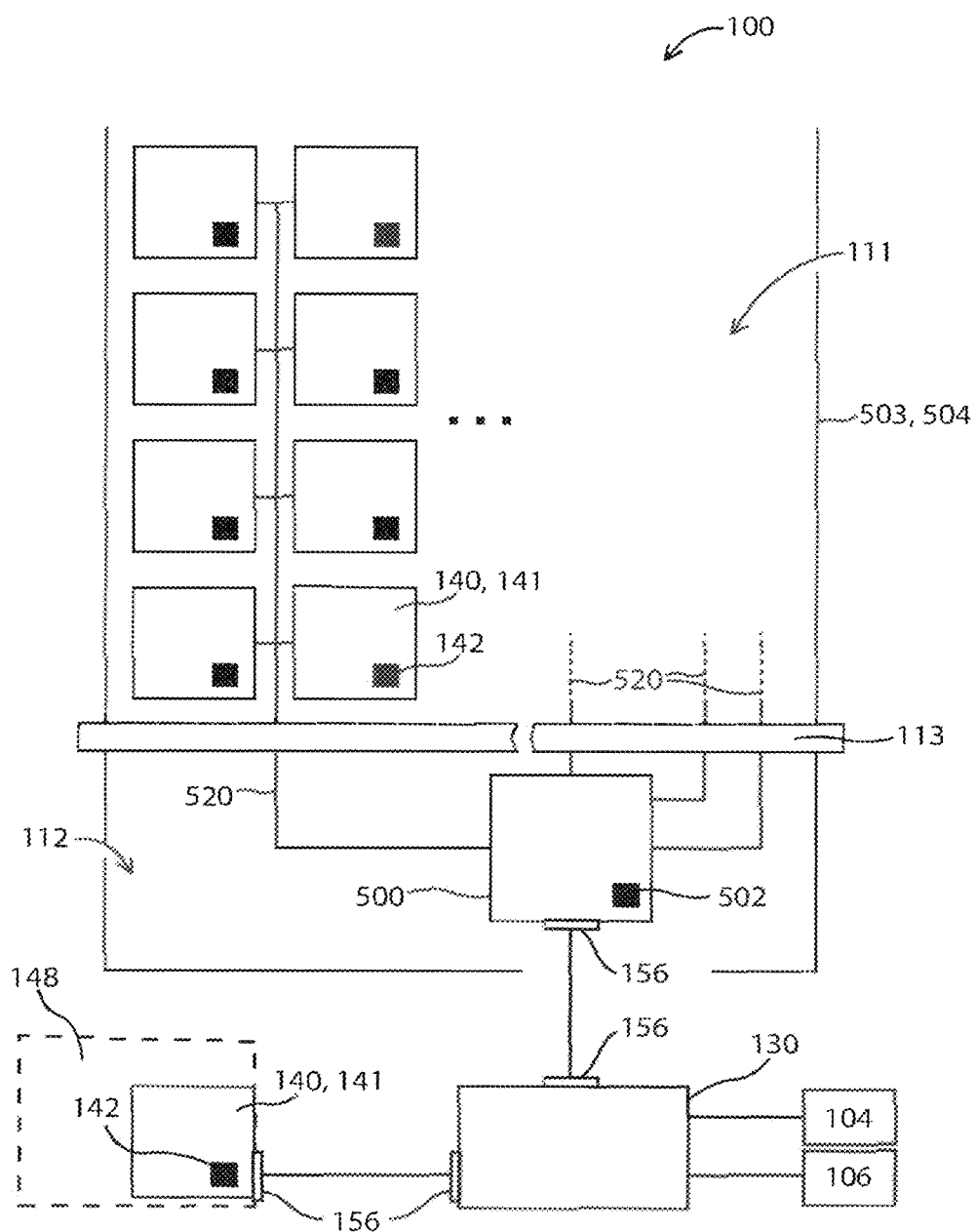
FIG. 7 gives an overview of the automated test equipment.

FIG. 7 gives an overview of the automated test equipment and shows a portion of a temperature chamber 111, a thermal insulation 113 separating the temperature chamber 111 and an ambient temperature area 112. In the temperature chamber 111 there may be a group of 8 spare parts 140, or contact sockets 141 arranged in two rows of 4. Each of the contact sockets 141 may comprise an electronic component 142. The group of 8 contact sockets 141 may be electrically connected to a data buffer unit 500, so that data stored inside the electronic components 142 may be submitted to, and processed by a microcontroller 502 being integral of the data buffer unit 500. The data buffer unit 500 and the contact sockets 141 may be arranged on a board 503, and or an interchangeable interface board 504. First, the electronic component 142 of each contact socket 141 may be coupled and transfer data directly to an operator terminal 130. Second, the electronic component 142 of each contact socket 141 may be coupled and transfer data to the operator terminal 130 when the contact socket 141 is located, or received in a manual maintenance station 148. Third, the data buffer unit 500 may be adapted to identify each of the contact socket 141 by a specific ID of each contact socket 141, so that the data buffer unit 500 may transmit data from each contact socket 141 towards the operator terminal 130. The operator terminal 130 (, or the data buffer unit 500, and also the spare part 140, or contact socket 141) may transmit data to a maintenance planning and control unit 104, and/or a control computer 106 comprising a dedicated database (see also FIG. 1B).

Figure 1A:
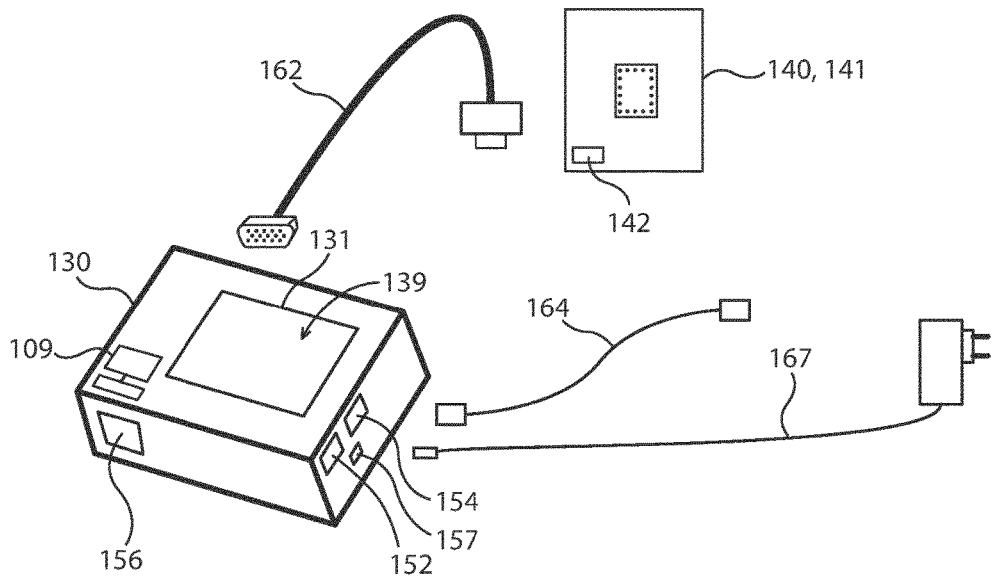
FIG. 1A shows an operator terminal and a spare part.
Figure 1B:
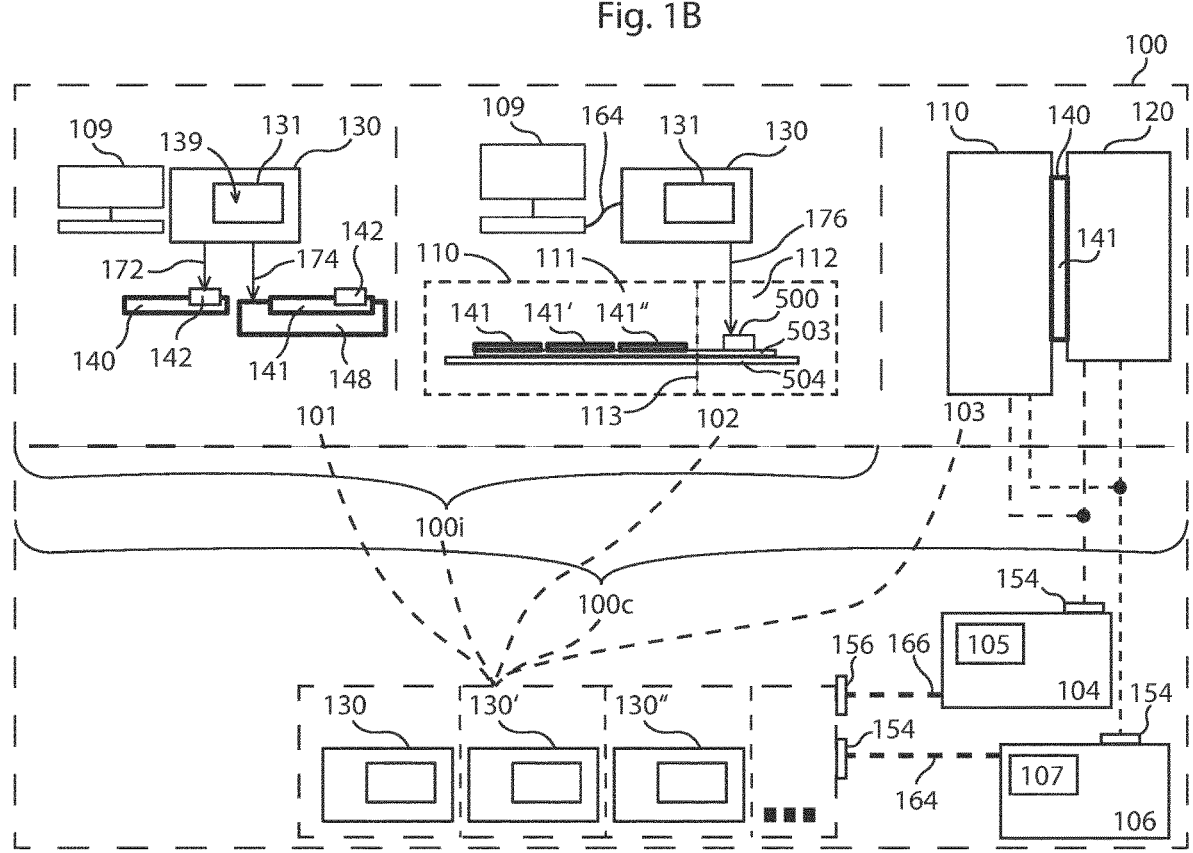
FIG. 1B shows the automated test equipment in a schematic overview.

FIG. 1A shows an operator terminal 130 and a spare part 140 as parts of an automated test equipment (see FIG. 1B). The spare part 140 may be a contact socket 141. The spare part 140, or contact socket 141, may comprise an electronic component 142 on which data regarding the spare part 140, or contact socket 141 may be stored and/or processed. The operator terminal 130 may comprise a display 131, and may be adapted to show spare part data within a specific GUI 139. The operator terminal 130 may comprise a data exchange interface 152 being adapted to exchange data with the spare part 140 via a data exchange cable 162. The data exchange may comprise receiving data from and/or sending data to the electronic component 142. The operator terminal 130 may further comprise a data exchange interface 154, and a data exchange cable 164 in order to connect to other parts of the automated test equipment 100. The operator terminal 130 may further comprise a handheld computer 109 comprising an internet interface 156 for connecting to the internet. By using the internet interface 156 the handheld computer 109 may upgrade, and/or receive maintenance instructions, and/or firmware updates regarding the test equipment 100. Moreover, the operator terminal 130 may comprise a power supply interface 157 for connecting to a power supply 167.

FIG. 1B shows the automated test equipment 100 in a schematic overview. There may be various ways of the operator terminal 130 for being used in the automated test equipment 100.

There may be a first subtype of a standalone version 101 in which the singulated spare part 140 is directly coupled 172 to the operator terminal 130, so that data stored on the electronic component 142 may be displayed by the display 131 within the GUI 139. According to a second subtype of the standalone version 101 the operator terminal 130 may indirectly connect 174 to the singulated electronic component 142. The spare part 140, or contact socket 141, may be integrated in, or may contact to the manual maintenance station 148, and the operator terminal 130 contacts to the spare part 140 (or contact socket 141) via the manual maintenance station 148. The first subtype of the standalone version 101, and the second subtype of standalone version 102 may be summarized by calling it standalone version 100i.

In a semi standalone version 102, and using a data buffering unit 500, there may be multiple contact sockets 141, 141', 141', and the operator terminal 130 may mutually contact 176 to respective electronic components 142 of the respective contact sockets 141, 141', etc. (or spare parts 140, 140', etc.) which are mounted on a board 503. The operator terminal 130 may mutually contact 176 via the board 503 or via an interchangeable interface board 504 carrying the board 503. Mutually contacting 176 in the semi standalone version 102 may include the board 503 and/or the interchangeable interface board 504 being mounted to the handler 110. The contact sockets 141, 141', etc. may be located inside a temperature chamber 111, and the data buffering unit 500 may be located separated by an insulation 113 in an ambient temperature area 112.

With an integrated contacting version 103 the spare part 140 or the contact socket 141 may be arranged inside a test environment comprising the handler 110 and a tester 120.

The three ways of contacting such as the two typed of the standalone version 101, the semi standalone version 102, and the integrated version 103 may be called completed version 100c for contacting. In each version of contacting data may be provided to be stored on various operator terminals 130, 130', 130'.

The automated test equipment 100 may further comprise a maintenance planning and control unit 104 for planning and controlling maintenance actions within the test equipment 100. The maintenance planning and control unit 104 may comprise a processing unit 105 and a data exchange interface 154, which may be connected or connectable to the electronic component 142 of the spare part 140. This may be given, even if the spare part 140, or contact socket 141, is integrally mounted in between the handler 110 and/or semiconductor device tester 120 so that the maintenance planning and control unit 104 may exchange data from and to the electronic component 142 during testing or in periods of breaks, also called "index time". The data exchange interface 154 of the maintenance planning and control unit 104 may be similar or identical to the data exchange interface 154 of the operator terminal 130 so that the maintenance planning and control unit 104 may also be adapted to receive data from the operator terminal 130.

Moreover, the automated test equipment 100 may comprise a dedicated database 107 residing in a control computer 106 for storing data regarding a working setup for the spare part 140 in the database 107 for use by the test handler 110. The control computer 106 may comprise a data exchange interface 154 for contacting towards the electronic component 142 of the spare part during testing and in index times like breaks. Both, the maintenance planning and control unit 104 and the control computer 106 may contact to the handler 110 and/or to the semiconductor device tester 120. Further, the maintenance planning and control unit 104 and the control computer 106 may additionally or alternatively comprise and internet interface or a WLAN connection to exchange data with each other component of the automated test equipment 100.

Figure 2A:
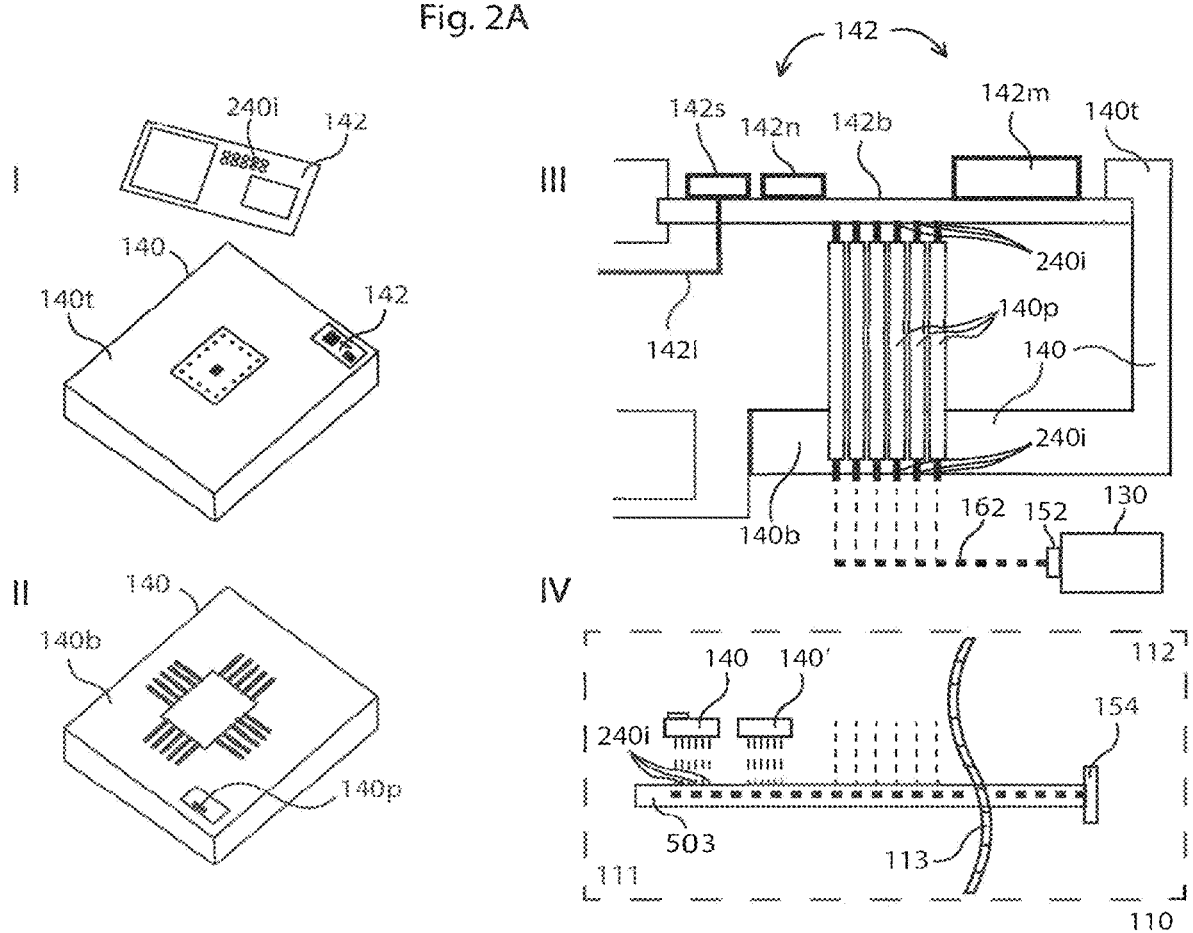
FIG. 2A shows a spare part or contact socket in perspective views with cross-sectional views.

FIG. 2A shows a spare part or contact socket in perspective views and with cross-sectional views.

Figure 2B:
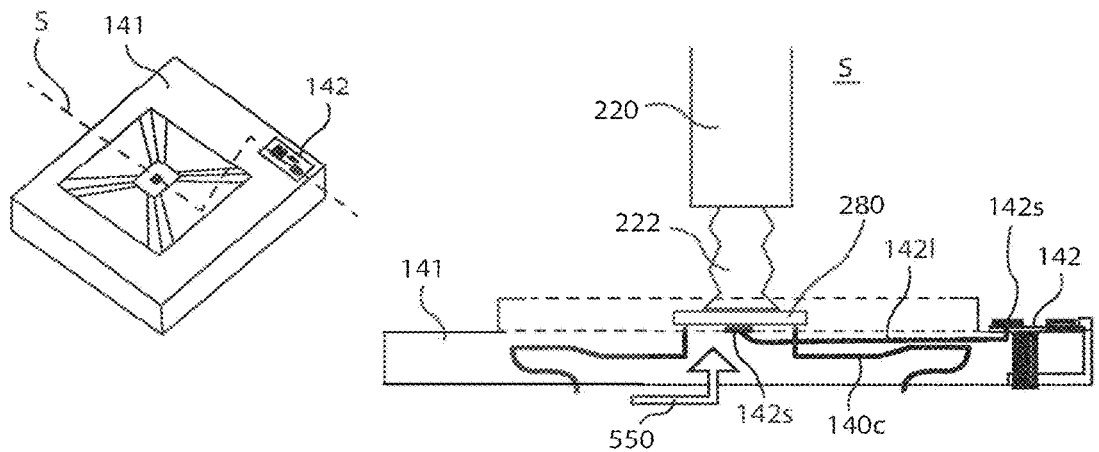
FIG. 2B shows a perspective and cross-sectional view of the contact socket.

In I of FIG. 2A, the electronic component 142 is lifted off a top side 140*t* of the spare part 140. The electronic component 142 may comprise a contact interface 240*i*. II of FIG. 2B shows the contact socket 141 in a perspective view from the bottom side 140*b*. Contact pins 140*p* may extend from the top side 140*t* through the contact socket 140 to the bottom side 140*b* where the pins 140*p* may provide a data connection interface 152. FIG. 2A III shows a cross-sectional view of the spare part 140, or contact socket 141 in the area of the electronic component 142. The electronic component 142 may comprise a board 142*b* on which a programmable microcontroller 142*n* and/or a memory 142*m*, in particular an EEPROM 142*m* are mounted. Further, the electronic component 142 may comprise at least one of the group of a temperature sensor 142*s*, a pressure sensor 142*s*, an acceleration sensor 142*s*, an ESD sensor 142*s*, and a touchdown counter 142*s*, wherein each is internally connected to the electronic component 142. The pins 140*p* may be clamped inside the spare part 140 between the board 142*b* of the electronic component 142 and the bottom side 140*b* of the spare part 140, so that contact pin tips 140*p* may form a spare part interface 240*i* on the bottom side 140*b* of the spare part 140. Alternatively, a bottom side of the board 142*b* may also provide contacts which may be used as a spare part interface 240*i*. The data exchange cable 162, 164 may be connected to the spare part interface 240*i* and to the data exchange interface 152 of the operator terminal 130. A function of a sensor cable 1421 extending from the board 142*b* may be described with FIG. 2B in more detail. In FIG. 2A IV a schematic cross-sectional view of a board 503 shows a plurality of spare parts 140, 140', etc. being arranged on the board 503 and contacting with their respective spare part interfaces 240*i* towards the board 503 which, by comprising the data exchange interface 154, may be connected to the operator terminal 130. When being located inside the handler 110 the spare parts 140, 140', may be arranged inside a temperature chamber 111 being separated from the ambient section 112 of the handler 110.

FIG. 2B shows a perspective view of the contact socket 141 on the left hand and indicating with a dashed line "S" the cross-section being shown on the right-hand side. A plunger 220 with a nozzle 222 is holding and moving the semiconductor device 280 and presses the semiconductor device 280 onto contact springs 140*c* of the contact socket 141. A tempering air outlet 550 directs the tempered air towards the semiconductor device 280. The temperature sensor 142*s* may be positioned directly under the semiconductor device 280 for acquiring the same temperature like the semiconductor device 280. The sensor cable 1421 guides the sensed temperature towards the part of the electronic component 142 where the information may be stored and processed to be further submitted towards the operator terminal 130, or to the data buffer unit 500, respectively.

Figure 3A:
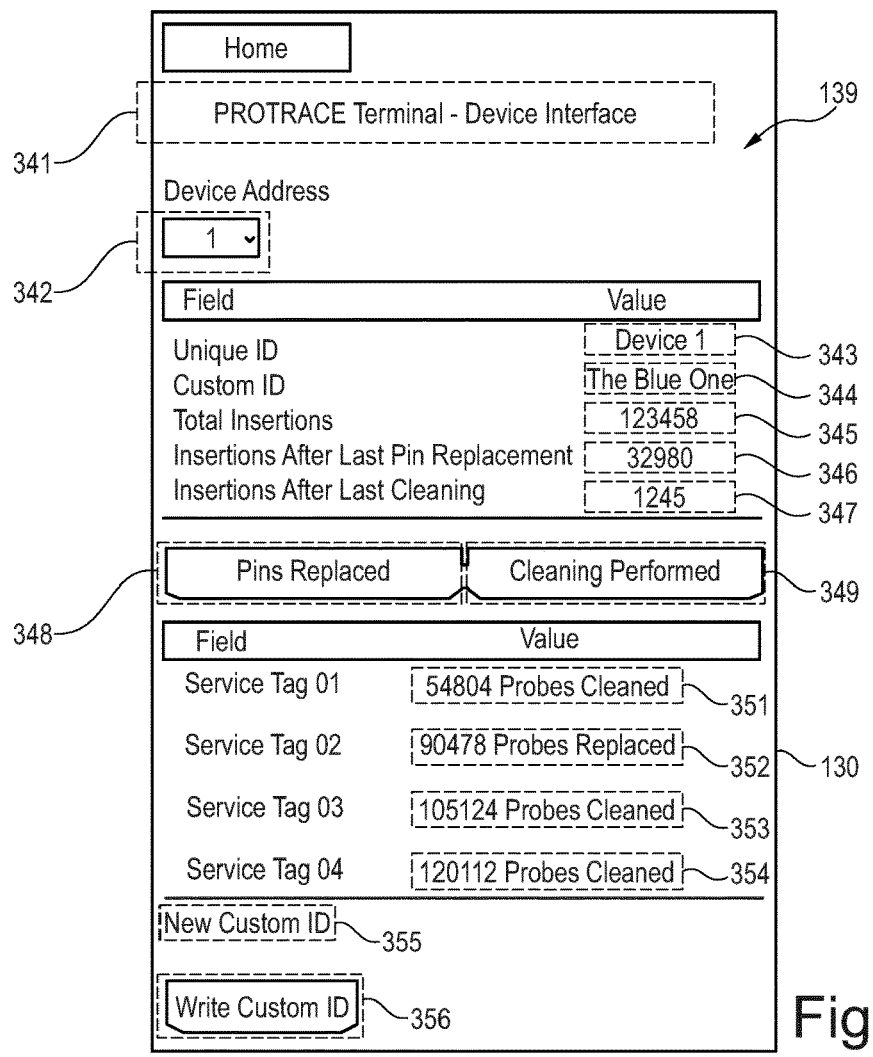
FIG. 3A shows the GUI of the operator terminal.

FIG. 3A shows the GUI 139 of the operator terminal 130. The GUI 139 may comprise: A header 341 on top which characterizes the device as operator terminal 130. With a device address 342 second the top, an operator on the test floor may immediately recognize the operator terminal 130. In a first area for each field there is basic information about the spare part 140, or contact socket 141 in 5 lines, which are: A unique ID 343, a custom ID 344, a total amount of insertions 345 (for the contact socket), the amount of insertions after a last pin replacement 346, and the amount of insertions after a last cleaning 347 of the contact socket 141. Further below the first area and central of the GUI 139, two bars may indicate in colours and in white letters required actions "red" or no need for actions "green", e.g.: "Pin Replaced" 348 on the left and "Cleaning Performed" 349 on the right, both in green in this case. A further area below the two bars 348, 349 there may be two rows, one called "Field" and the other "Value" and comprising four lines (351, 352, 353, 354) indicating in the row "Field" so called "service tags", where the service tags are listed and in the second row "Value" in more detail, what type of maintenance (service tag) has been done and what was the number of insertions when doing the respective service. E.g., the value may comprise entries like "54804 Probes Cleaned" for a first "Service Tag 01" (first line 351), or entries like "90478 Probes Replaced" for a second "Service Tag 02" (second line 352). In addition, the GUI 139 may comprise a field for generating a "New Custom ID" 355 and a field to "Write Custom ID" 356.

Figure 3B:
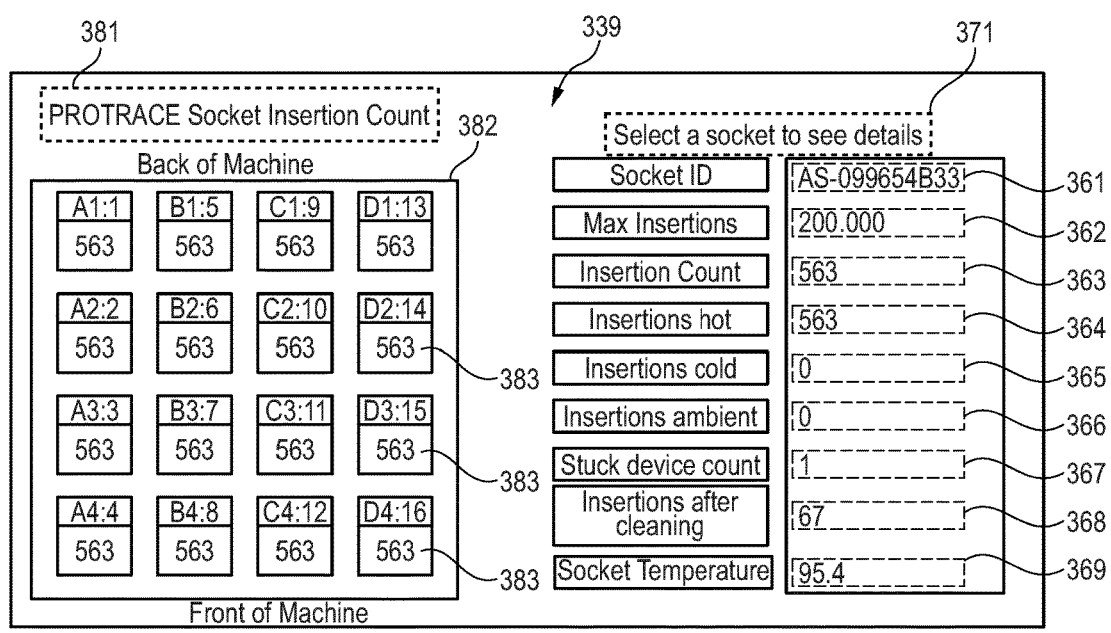
FIG. 3B shows a handler GUI.

FIG. 3B shows a related GUI 339 of the handler 110, or handler GUI 339. The handler GUI 339 may comprise a left area comprising information about the "Socket Insertion Count" 381 as a header and below an insertion count matrix 382 with entries of, e.g. 4×4 fields wherein each field 383 comprises an entry about the position, e.g. "D4:16" (with four rows A to D and indices 1 to 4 for four lines; and/or numbers from 1 to 16 for every cell of the matrix). The handler GUI 339 may comprise more "detailed information" 371 about the respective contact socket 141, when one of the cells (1 to 16), and hence a contact socket 141 is selected. In two rows ("explanation" on the left; "value" on the right) an operator may get detailed information in nine lines, such as "socket ID" 361, "maximum insertions" 362, "insertion count" 363, "insertion hot" (with high temperature) 364, "insertion cold" (with cold temperature) 365, "insertions ambient" (insertions at ambient temperature) 366, "stuck device count" (how man devices were stuck) 367, "insertions after cleaning" (how many insertions are after cleaning) 368, and "socket temperature" (live monitoring of the socket temperature) 369. The information displayed with the terminal GUI 139 and on the handler GUI 339 may be shaped towards the needs of a customer in relation with a nature of a specific spare part 140.

Figure 4A:
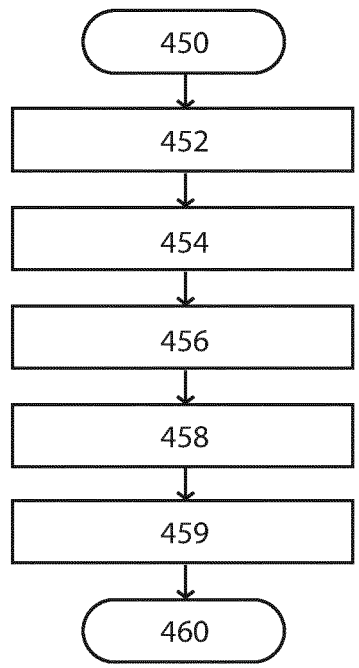
FIG. 4A shows an execution flow diagram of the operator terminal.
Figure 4B:
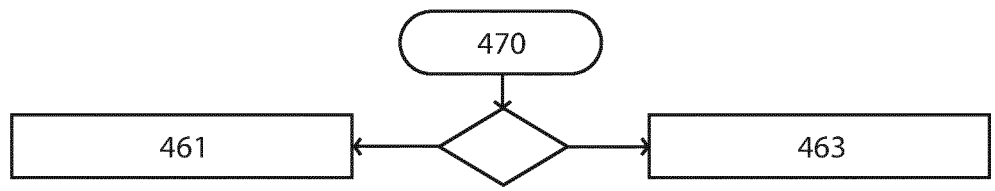
FIG. 4B shows a further execution flow diagram of the operator terminal.
Figure 4B:
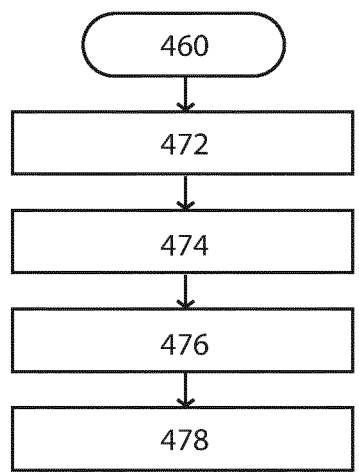

FIG. 4A and FIG. 4B show an execution flow diagram of the operator terminal 130. In FIG. 4*a* it starts with a power up 450, and continues with finding a service tag "find service tag" 452, for which an address of the related contact socket 141 "get socket address" 454 may be displayed. After that, more technical tasks may be executed, such as "setup I2C" 456 (the electronic component 142 on the contact socket 141 may be activated), "setup ADC" 458 (to derive binary data from the sensors 142*s* signals), "enable interrupts" 459 (to achieve regulated data transmission), and "idle loop" 460 (begin loop). FIG. 4B describes in an upper section that after an "I2C Interrupt" 460, there may be either data received "receive data" 461, or there may be data to be requested "request data" 463.

In FIG. 4B the lower section lists a sequence of tasks after start of an "idle loop" 460, which may be: "measure contact" 472, "measure temperature" 474, "EEPROM write" 476, and "check alarm" 478.

Figure 5B:
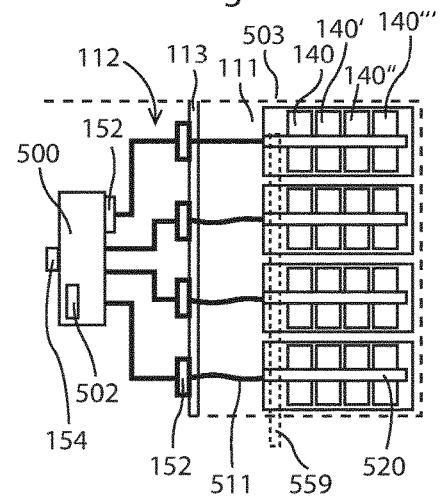
FIG. 5B depicts schematically a contact unit as a part of the automated test equipment.
Figure 5A:
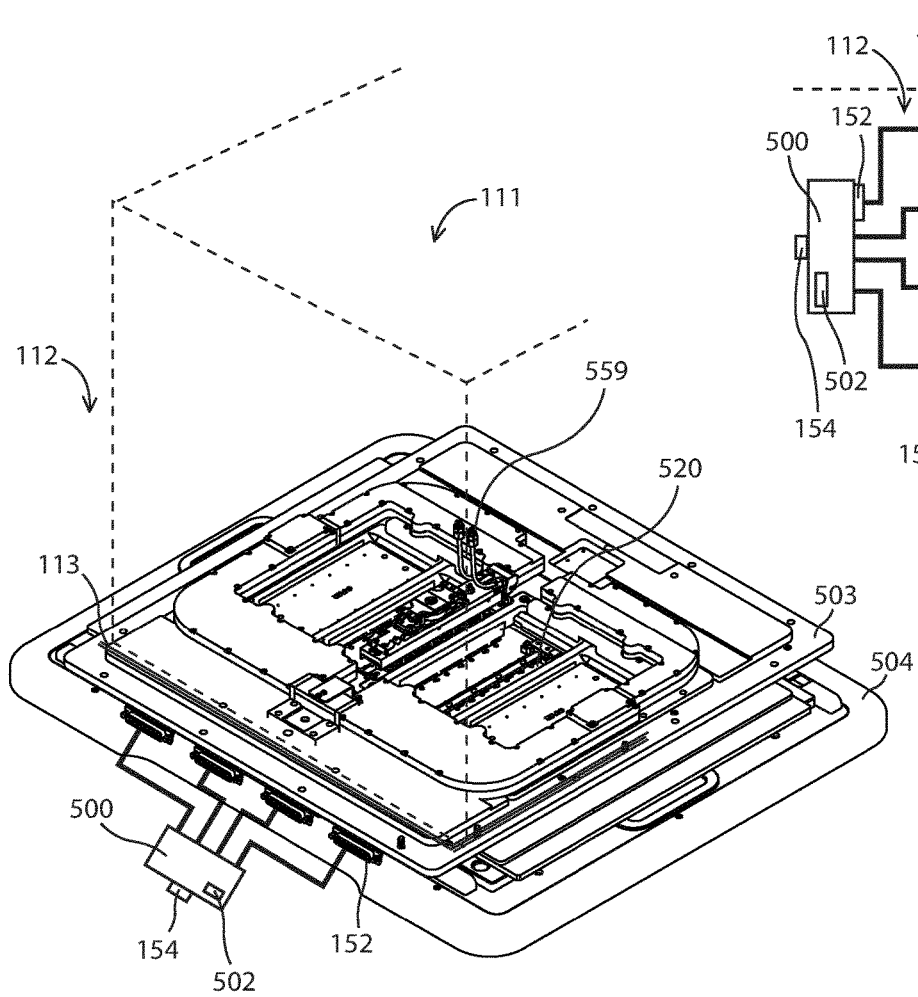
FIG. 5A shows a perspective view of a contact unit as a part of the automated test equipment.

FIG. 5A shows a perspective view of a contact unit as a part of an automated test equipment 100 (See FIG. 1B; 102). First, turning to FIG. 5B there are four contact sockets 140, 140', 140'', 140''' in one row (out of 8 rows of contact sockets). Two rows of four sockets are grouped on either side of a thermal manifold 520, also supplying an electrical contact, so that 8 contact sockets end in one flex cable 511, electrically terminating in one data exchange interface 152 each. The 4 data exchange interfaces 152 are then couple the buffer unit 500 also comprising data exchange interfaces 152 for this purpose. The buffer unit 500 may further comprise a further data exchange interface 154 providing a higher bandwidth for submitting data towards the operator terminal 130, the handler 110, or towards the semiconductor device tester 110. The 36 contact sockets, in complete, may be arranged within a temperature chamber 111 and on a board 503. The data buffer unit 500 may be arranged in an ambient temperature area 112 being separated from the temperature chamber 111 by a thermal insulation 113.

In FIG. 5A the perspective view also includes the board 503, and in addition an interchangeable interface board 504 supporting the board 503 on which the spare parts 140 are located. A temperature air supply 559 may be coupled to each of the manifold 520. Again, there may be a temperature chamber 111 being separated from an outside ambient temperature area 112, ambient space, by the thermal insulation 113.

Figure 5C:
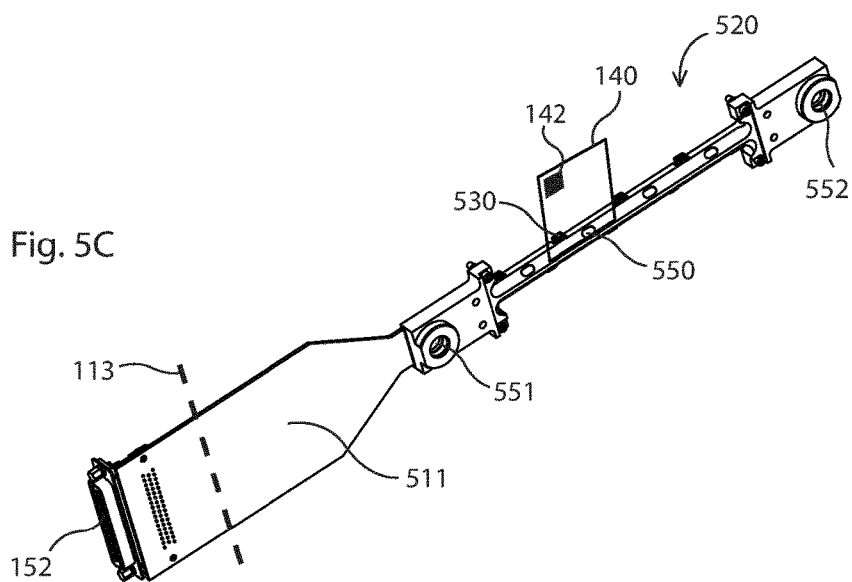
FIG. 5C shows a manifold in a perspective view.

FIG. 5C shows one manifold 520 in a perspective view. The manifold 520 comprises an inlet 551 and a further inlet 552 or an outlet 552 between which the tempered is guided. Further, the manifold 520 comprises the tempering air outlet 550 which directs the airflow unidirectional towards a centre of a respective test socket 141 comprising the electronic component 142. An electrical contact 530 may provide a connection between the electronic component 142 and the data exchange interface 152. A flex cable 511 provides a robust and flexible connection between one end of the manifold 520 and the data exchange interface 152. The flex cable 511 may cross an insulation 113 from the manifold 520 inside the temperature chamber 111 towards, the opposite side, an ambient temperature area 112, where the flex cable 511 terminates in the data exchange interface 152.

Figure 6A:
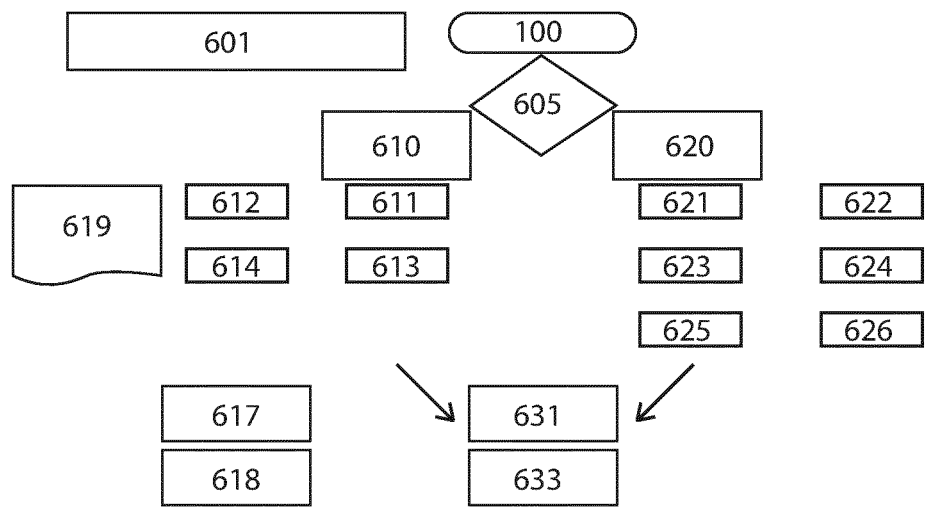
FIG. 6A shows a conceptual overview over the automated test equipment.

FIG. 6A gives an overview over the automated test equipment 100. The automated test equipment 100 applies to any spare part 140 and it may be characterized with enhancing a spare part 140 becoming "intelligent+unique ID+sensing" 601. Then according to a decision whether the automated test equipment 100 is "Standalone or in System?" 605, there may remain two halves of features:

For the first half, when being a "stand alone socket operation" 610 the automated test equipment 100 provides a "data transfer" 611 (between the contact socket 141 and the operator terminal 130) being "wire or wireless" 612. A function of "read and write" 613 may be achieved by the "handheld terminal" 614, wherein the handheld terminal 614 may be identical with the operator terminal 130 (FIG. 1A). The "stand-alone socket operation" 610 may support a "data base (106) on a test floor and as an independent application" 617. Moreover, the "stand alone socket operation" 610 may be compatible with any "intelligent software" 618 for future development.

For the second half, when used while the system, comprising the handler 110 and the semiconductor device tester 120 are running, called "in system operation" 620, the "data transfer" 621 may again arbitrarily be chosen "wire or wireless" 622. A "data buffer including consolidation" 623 may be supported by a dedicated "interface board 624. The function of "read and write" 625 may be supported by both the "handler system (110)+the operator terminal (130)" 626.

Common for the "stand alone socket operation" 610 and the "in system operation" 620 may be: A "data consolidation from test floor/side/facility" 631 being achievable for both. A "data analysis/device strategy" in order to achieve better results may be implemented with both, the "stand alone socket operation" 610 and the "in system operation" 620.

Figure 6B:
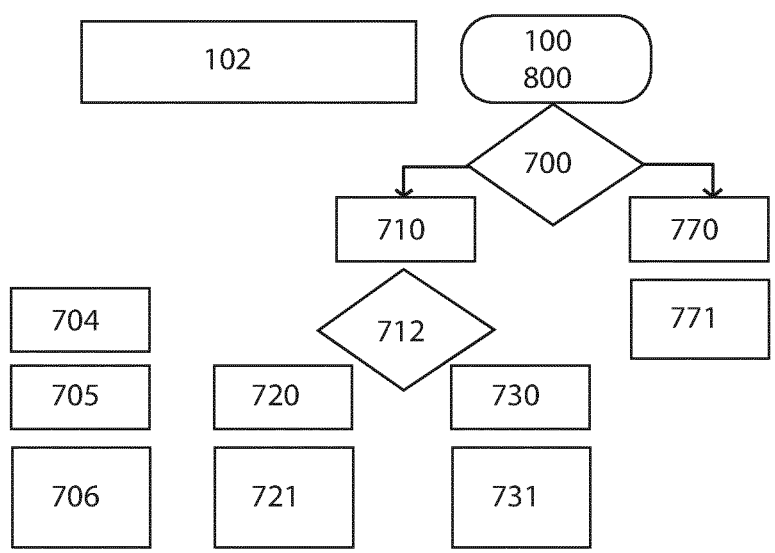
FIG. 6B shows a further conceptual overview over the automated test equipment.

FIG. 6B shows a feature compatibility of the automated test equipment 100 including specific test requirements, such as "sensor test" 800. An automated test equipment 100 being labelled with the "genuine operator terminal function" 102 may have a different scope of functionality according to an "equipment check" 700. If "no such functionality" 770 is existent then the spare part 140, the contact socket 141, and any other spare part type may still be usable within the scope of previous usage. If the specific function as a "genuine operator terminal" 102 is given and valid, then features are supported such as "unique ID reading" 704 by the microcontroller 142m, "socket+sensing" 705 directly supporting testing of MEMS sensors, and "socket sensing" 706 related to the contact socket 141, in particular the reliability of the contact socket 141, while testing of MEMS sensors are derived. Based on the "equipment check" 700 and the mentioned added functionality two different branches may apply the more concise "equipment check" 712, and may support the functionality when, first, needed as a "setup tool" 720 including an "initial setup for sensing, calibration, and rapid loading" 721. A second branch of application is directed towards the "spare part functionality" 730 when "thermal features" 731 are used to control the system, including the handler 110 and/or semiconductor device tester 120 for controlling the whole automated test equipment 100 originating from the specified spare part 140.

The invention claimed is:

1. An automated test equipment for testing semiconductor devices, the test equipment comprising:
 a test handler comprising one or more exchangeable component parts, each exchangeable component part comprising an electronic component physically positioned therein or thereon, each electronic component comprising:
  a memory configured to store data regarding the exchangeable component part, and
  a microcontroller configured to process the data regarding the exchangeable component part; and
 an operator terminal comprising a display or GUI and a data exchange interface disposed physically external to the test handler while being electrically connected or connectable to the each electronic component of the one or more exchangeable component parts, the operator terminal configured to at least display data stored in the each electronic component.

2. The automated test equipment according to claim 1, wherein the one or more exchangeable component parts comprise at least one contact socket configured to contact a semiconductor device.

3. An automated test equipment for testing semiconductor devices, the test equipment comprising:
- a test handler comprising one or more exchangeable component parts, each exchangeable component part comprising an electronic component physically positioned therein or thereon, each electronic component comprising:
  - a memory configured to store data regarding the exchangeable component part, and
  - a microcontroller configured to process the data regarding the exchangeable component part; and
- a data buffer unit comprising a data exchange interface being electrically connected or connectable to the each electronic component of the one or more exchangeable component parts, the data buffer unit configured to buffer the data stored in the each electronic component,
- wherein the data buffer unit is adapted to address the one or more exchangeable component parts and comprises a second microcontroller adapted for one or both of processing the data from the one or more exchangeable component parts and deriving the data or instructions for the one or more exchangeable component parts.

4. The automated test equipment according to claim 3, wherein the data buffer unit is located on a board which is connected or connectable to multiple exchangeable component parts or is located on an interchangeable interface board.

5. The automated test equipment according to claim 3, further comprising:
- an operator terminal comprising a display or GUI and a data exchange interface disposed physically external to the test handler while being electrically connected or connectable to the each electronic component within the one or more exchangeable component parts, the operator terminal configured to display data stored in the each electronic component.

6. The automated test equipment according to claim 5, wherein the data exchange interface is, at least in part, common for one or more of the operator terminal and the buffer unit, a maintenance planning and control unit and a dedicated database.

7. The automated test equipment according to claim 5, wherein the operator terminal comprises a handheld computer configured for one or more of processing data obtained from the each electronic component of the one or more exchangeable component parts, sending data or instructions to the each electronic component.

8. The automated test equipment of claim 7, wherein the handheld computer comprises an internet interface for at least temporarily connecting it to the internet, the internet interface configured for one or more of upgrading the handheld computer, receiving maintenance instructions and receiving firmware updates regarding the test equipment through the internet.

9. The automated test equipment according to claim 3, further comprising:
- a maintenance planning and control unit comprising a processing unit and a data exchange interface disposed physically external to the test handler while being electrically connected or connectable to the each electronic component of the one or more exchangeable component parts, the maintenance planning and control unit configured to plan and control maintenance actions of the test equipment.

10. The automated test equipment according to claim 9, wherein the maintenance planning and control unit is adapted to derive maintenance instructions based on data regarding and obtained from the one or more exchangeable component parts and includes one or more of a data statistics unit, a predictive maintenance triggering unit, a failure pattern recognition unit and an emergency stop triggering unit.

11. The automated test equipment according to claim 3, the test equipment further comprising:
- a control computer comprising a dedicated database; and
  - a data exchange interface disposed physically external to the test handler while being electrically connected or connectable to the each electronic component of the one or more exchangeable component parts,
- wherein the dedicated database is configured to store data regarding a working setup for the one or more exchangeable component parts in the dedicated database for use by the test handler.

12. The automated test equipment according to claim 11, wherein the dedicated database comprises information regarding one or more of a test floor, a site fleet performance, sensor data, operations data and power monitoring data regarding specific tests.

13. The automated test equipment according to claim 3, wherein at least one of the one or more exchangeable component parts comprises one or more of a temperature sensor, a pressure sensor, an acceleration sensor, an ESD sensor and a touchdown counter each internally connected to the electronic component.

14. The automated test equipment according to claim 3, wherein, the memory comprises an electrically erasable programmable read-only memory that is temperature-stable up to 175° C.

15. The automated test equipment according to claim 3, wherein the one or more exchangeable component parts each comprise a unique ID tag and the data exchange interface is adapted to externally transmit the unique ID tag.

16. The automated test equipment according to claim 3, wherein the one or more exchangeable component parts each comprise a component part interface adapted to be connected to the data exchange interface.

17. The automated test equipment according to claim 3, wherein the one or more exchangeable component parts comprise at least one contact socket configured to contact a semiconductor device.

18. An automated test equipment for testing semiconductor devices, the test equipment comprising:
- a test handler comprising one or more exchangeable component parts, each exchangeable component part comprising an electronic component physically positioned therein or thereon, each electronic component comprising:
  - a memory configured to store data regarding the exchangeable component part, and
  - a microcontroller configured to process the data regarding the exchangeable component part; and
- a maintenance planning and control unit comprising a processing unit and a data exchange interface disposed physically external to the test handler while being electrically connected or connectable to the each electronic component of the one or more exchangeable component parts, the maintenance planning and control unit configured to plan and control maintenance actions of the test equipment.

19. The automated test equipment according to claim 18, wherein the one or more exchangeable component parts comprise at least one contact socket configured to contact a semiconductor device.

20. An automated test equipment for testing semiconductor devices, the test equipment comprising:
- a test handler comprising one or more exchangeable component parts, each exchangeable component part comprising an electronic component physically positioned therein or thereon, each electronic component comprising:
    - a memory configured to store data regarding the exchangeable component part, and
    - a microcontroller configured to process the data regarding the exchangeable component part; and
- a control computer comprising a dedicated database and a data exchange interface disposed physically external to the test handler while being electrically connected or connectable to the each electronic component of the one or more exchangeable component parts,
- wherein the dedicated database is configured to store data regarding a working setup for the one or more exchangeable component parts in the dedicated database for use by the test handler.

* * * * *